United States Patent
Paulsen

(10) Patent No.: US 9,262,651 B2
(45) Date of Patent: Feb. 16, 2016

(54) METHOD FOR PREVENTING UNINTENDED CONTACTLESS INTERACTION WHEN PERFORMING CONTACT INTERACTION

(71) Applicant: CIRQUE CORPORATION, Salt Lake City, UT (US)

(72) Inventor: Keith L. Paulsen, Centerville, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 14/150,509

(22) Filed: Jan. 8, 2014

(65) Prior Publication Data

US 2014/0191031 A1  Jul. 10, 2014

Related U.S. Application Data

(60) Provisional application No. 61/750,240, filed on Jan. 8, 2013.

(51) Int. Cl.
*G06K 7/00* (2006.01)
*G06K 19/077* (2006.01)

(52) U.S. Cl.
CPC ........ *G06K 7/0004* (2013.01); *G06K 19/07769* (2013.01)

(58) Field of Classification Search
USPC .................................. 235/440, 451
See application file for complete search history.

(56) References Cited

U.S. PATENT DOCUMENTS

| | | | |
|---|---|---|---|
| 5,416,423 A * | 5/1995 | De Borde | 324/677 |
| 5,856,822 A | 1/1999 | Du et al. | |
| 6,380,930 B1 | 4/2002 | Van Ruymbeke | |
| 6,486,862 B1 | 11/2002 | Jacobsen et al. | |
| 6,629,637 B1 * | 10/2003 | Von Der Lippe et al. | 235/451 |
| 6,867,981 B2 | 3/2005 | Murohara | |
| 7,306,144 B2 | 12/2007 | Moore et al. | |
| 2002/0135568 A1 | 9/2002 | Chen | |
| 2003/0172279 A1 | 9/2003 | Yudasaka | |
| 2004/0077313 A1 | 4/2004 | Oba et al. | |
| 2005/0001711 A1 | 1/2005 | Doughty et al. | |
| 2005/0218227 A1 * | 10/2005 | Takita et al. | 235/441 |
| 2007/0239981 A1 | 10/2007 | Lessing | |
| 2007/0287503 A1 | 12/2007 | Ying et al. | |
| 2008/0143683 A1 | 6/2008 | Hotelling | |
| 2009/0137204 A1 | 5/2009 | Chang | |
| 2010/0059355 A1 | 3/2010 | Lefebvre | |
| 2010/0127828 A1 | 5/2010 | Connolly et al. | |
| 2010/0297952 A1 | 11/2010 | Rofougaran | |
| 2010/0315389 A1 | 12/2010 | Sorrell et al. | |
| 2011/0012793 A1 | 1/2011 | Amm et al. | |
| 2011/0057891 A1 | 3/2011 | Ham et al. | |
| 2011/0063224 A1 | 3/2011 | Vexo et al. | |
| 2011/0134051 A1 | 6/2011 | Lin | |
| 2011/0248940 A1 | 10/2011 | Chuang et al. | |

(Continued)

FOREIGN PATENT DOCUMENTS

| CN | 2436978 Y | 6/2001 |
|---|---|---|
| CN | 1490713 A | 4/2004 |

(Continued)

*Primary Examiner* — Daniel Hess

(74) *Attorney, Agent, or Firm* — Morriss O'Bryant Compagni, PC

(57) ABSTRACT

A system and method for enabling a dual interface smart card reader to be able to determine if data should be read from a smart card using wireless technology or touch technology, even when the data can be accessed through wireless technology.

7 Claims, 2 Drawing Sheets

(56) References Cited

U.S. PATENT DOCUMENTS

| | | |
|---|---|---|
| 2011/0273382 A1 | 11/2011 | Yoo et al. |
| 2011/0275421 A1 | 11/2011 | Wong et al. |
| 2012/0050015 A1 | 3/2012 | Low et al. |
| 2012/0162128 A1 | 6/2012 | Hyoung et al. |
| 2012/0234913 A1* | 9/2012 | Ramachandran et al. .... 235/379 |
| 2012/0287003 A1 | 11/2012 | Kao et al. |
| 2013/0059532 A1 | 3/2013 | Mahanfar et al. |
| 2013/0090073 A1 | 4/2013 | Zhu et al. |
| 2013/0161388 A1* | 6/2013 | Mitchell ....................... 235/436 |

FOREIGN PATENT DOCUMENTS

| | | |
|---|---|---|
| JP | 2001202483 A | 7/2001 |
| JP | 2002215330 A | 8/2002 |
| JP | 2002268768 A | 9/2002 |
| JP | 2002540512 A | 11/2002 |
| JP | 2003087263 A | 3/2003 |
| KR | 20010086928 A | 9/2001 |

* cited by examiner

METHOD FOR PREVENTING UNINTENDED CONTACTLESS INTERACTION WHEN PERFORMING CONTACT INTERACTION

BACKGROUND OF THE INVENTION

1. Field of the Invention

This invention relates generally to touch sensors and near field communication technology such as NFC technology that is found in contactless smart cards. More specifically, the present invention is related to managing the reading of data that is typically stored in memory and which can be read through direct contact and wireless transmission.

2. Description of Related Art

There are several designs for capacitance sensitive touch sensors. It is useful to examine the underlying technology to better understand how a capacitance sensitive touchpad may be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

BRIEF SUMMARY OF THE INVENTION

In a preferred embodiment, the present invention is a system and method for enabling a dual interface smart card reader to be able to determine if data should be read from a smart card using wireless technology or touch technology, even when the data can be accessed through wireless technology.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensor" throughout this document includes any capacitive touch sensor device, including touchpads, touch screens and touch panels, and includes proximity and touch sensing capabilities.

A first embodiment of the present invention is directed to a dual-interface smart card reader. However, it should be understood that any data reading device that is capable of receiving input through direct contact with a memory device that is also capable of transmitting information via near field communication (NFC) or similar wireless technology to the data reading device may benefit.

Figure 1:
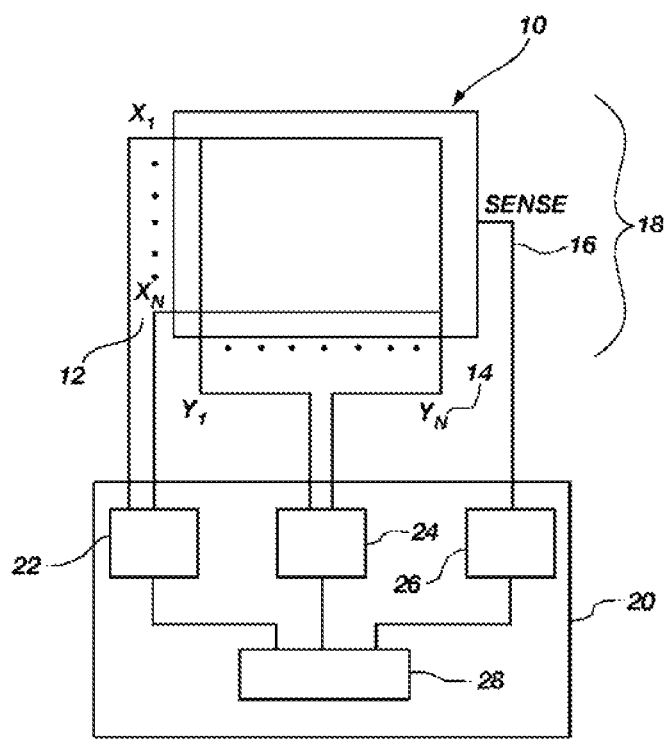
FIG. 1 is a block diagram of the components of a capacitance-sensitive touchpad as made by CIRQUE® Corporation and which can be operated in accordance with the principles of the present invention.
Figure 2:
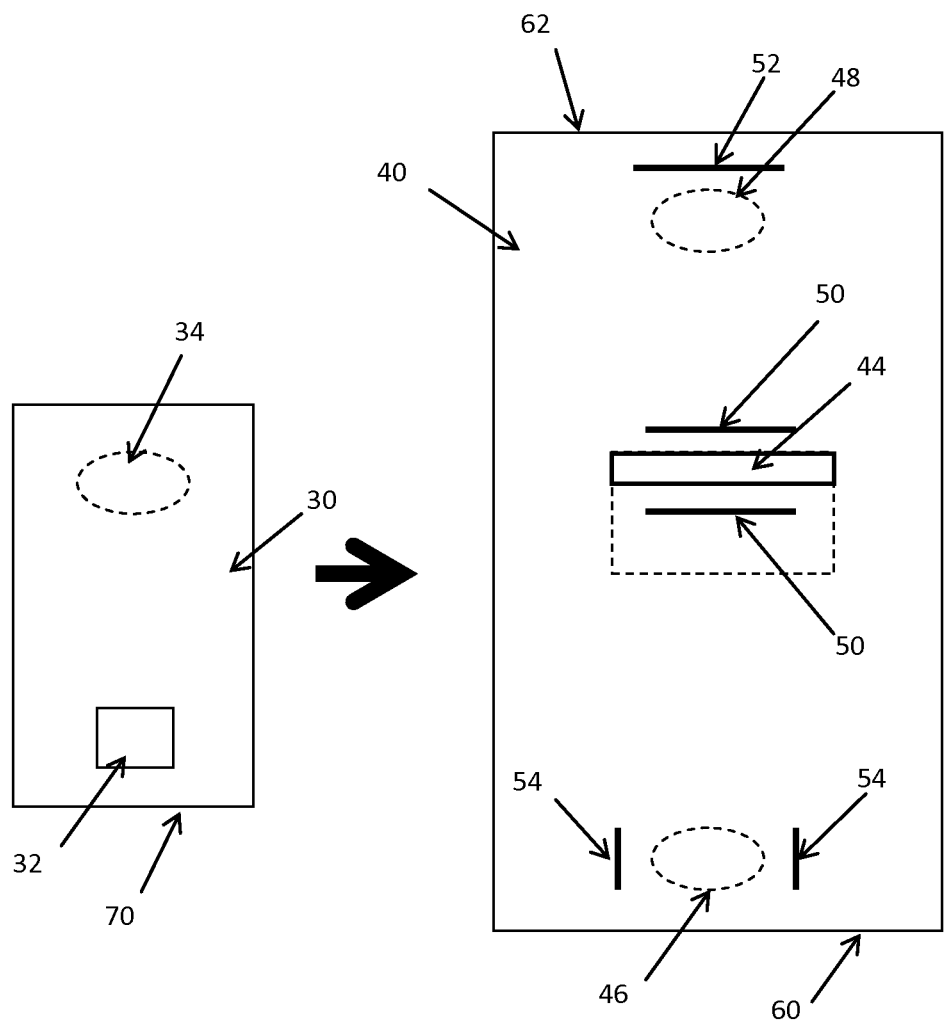
FIG. 2 is a diagram showing possible components of a dual interface smart card reader and a dual interface smart card, the dual interface comprised of near filed communication technology and direct contact technology.

FIG. 2 is a block diagram that shows a memory device such as a smart card 30. The smart card 30 may be used to perform a financial transaction. Thus, the smart card 30 may be a credit card, debit card, ATM card or any other card that may be used to perform a financial transaction using the data stored on the card. For example, the smart card 30 may store data regarding a financial account such as a credit card account number. The smart card 30 may also be incorporated into a mobile device such as a smart phone or a tablet. Instead of storing the data on a magnetic strip, the data may be stored in the memory of an integrated circuit memory 32. In this embodiment, the data stored on the integrated circuit 32 may be read at least two different ways.

The first way of enabling access to the data may be by direct contact with the smart card 30. The smart card 30 may include electrical contacts that provided access to the data stored in the integrated circuit memory 32. The example, the electrical contacts may be on an outside surface of the integrated circuit 32, or they may be disposed on an edge such as the bottom edge 70 of the smart card 30. A second way of providing access to the data may be by a contactless smart card reader that uses near field communication technology. Accordingly, there may be electrical contacts between the integrated circuit 32 and an antenna.

Near field communication technology may use an antenna 34 disposed in the smart card 30. The antenna 34 may be disposed on a surface but covered with a protective material, or disposed inside the smart card 30. The smart card 30 may not have to provide power to the near field communication antenna 34. The power to operate the antenna 34 and read the data stored in the integrated circuit memory 32 may come from a transmitting antenna of a smart card reader 40. The smart card reader 40 may include the ability to read the data stored in the integrated circuit memory 32 using at least two different methods.

For example, smart card reader 40 may include a direct contact data reader 42. There are many ways to implement a direct contact data reader 42 and which may be considered to be within the scope of the present invention. For example, a vertical or horizontal slot 44 may be included in the smart card reader 40. The slot may be perpendicular to a surface of the smart card reader 40 or it may be at some angle. What is important is that the smart card 30 may be inserted into the slot 44 until electrical contacts within the slot make contact with electrical contacts on the smart card. Data is then read from the integrated circuit memory 32.

The smart card reader 40 may also include a contactless system for reading data from the integrated circuit 32. Thus, the smart card reader 40 may include one or more near field communication antennas. For example, a near field communication antenna or contactless reader 46 may be part of a smart card reader 40, and may be disposed near a bottom edge 60.

However, a problem may arise if the user of the smart card 30 wants to have data read from the smart card using the direct contact reader 42. The smart card 30 may be brought close enough to the contactless reader 46 for data to be read wirelessly, even if the user does not intend for that to happen. The reasons for preferring one method of reading data from the smart card 40 are not material to the present invention. What is important is that one method may be preferred over the other, and the present invention provides a means for determining which method is preferred by the way that the smart card 40 is presented to the smart card reader.

It may be even more difficult to determine the intent of the user of the smart card 30 if the contactless reader is near the top edge 62 where the contactless reader 48 of the smart card reader 40 is located. In this example, the contactless reader 48 is located near the slot 44 because of physical size limitations of the smart card reader 40.

By determining the general angle of approach or position of the smart card 30 or using capacitance or inductance measurements, it may be possible to prevent the contactless reader 46 or 48 from making an unintended interaction such as, but not limited to, when a user is inserting the smart card 40 into the direct contact reader 42.

A first embodiment of the present invention may be the placement of one or more capacitance electrodes 50 near the aperture of the direct contact reader 42. In other words, one or more capacitance electrodes 50 may be disposed near, on, or even inside the slot 44. If the user slips the smart card 30 into the slot 44 of the direct contact reader 42, then one or more capacitance electrodes 50 near the slot 44 may indicate to the smart card reader 40 that the data should not be reader wirelessly by using the contactless readers 46 or 48.

In an alternative embodiment, the capacitance electrodes 50 may only cause a slight delay or hesitation before data is read using the contactless reader 46, 48 until it is more certain which reader is preferred by the user, as may be indicated by further actions.

It should be understood that the capacitance electrodes 50 are coupled to touch sensor capacitance technology that is capable of performing the functions indicated. Specifically, a touch sensor capacitance circuit may be capable of detecting the presence of the smart card 40. The touch sensor capacitance circuit may be provided by Cirque® Corporation.

In an alternative embodiment, other capacitance electrodes 52, 54 might be placed near the contactless card reader 46 or 48, to thereby enable the smart card reader 40 to determine if the smart card 30 is approaching the contactless readers 46, 48 instead of the direct contact reader 42.

It should be understood that the placement of the capacitance electrodes 50, 52 and 54, the direct contact reader 42 and the contactless readers 46 and 48 on the smart card reader 40 may be changed in order to make it easier to determine if the smart card 30 is approaching the direct contact reader 42 or the contactless readers 46, 48.

It may be possible to use the size of the signal from the capacitance electrodes 50, 52, 54 to determine which reading device 48, 44, 46 is going to read the data from the smart card 40. For example, capacitive signal strength may be an indicator. It may also be possible to compare readings from all of the capacitance electrodes 50, 52, 54 to determine where the smart card 30 is located relative to the reading devices 48, 44, 46. This may be accomplished by using a relative signal where the signal from all of the capacitance electrodes 50, 52, 55 is compared to each other and not an absolute signal strength.

In an alternative embodiment, a second set of capacitance electrode(s) may be used to sense objects in a contactless operating volume. In other words, the second set of capacitance electrode(s) may be directed to sensing movement of the smart card 30 within an operating volume that surrounds the smart card reader 40. By tracking movement of the smart card 40 within that operating volume, it may be possible to determine the intent of the user. In other words, it may be possible to tell if the user intends to read the smart card 30 using direct contact or using contactless technology.

In another alternative embodiment, the system may include multiple inductively coupled sense or receive antennas that may be strategically oriented to determine the general relative placement or approach of the near field communication antenna 34 on the smart card in order to determine if direct contact or non-contactless interaction is intended.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for determining if direct contact or contactless communication is to be performed with a smart card, said system comprised of:
   a smart card including a near field communication antenna for contactless communication, electrical traces for direct contact communication and an integrated circuit memory;
   a smart card reader including a near field communication antenna for contactless communication and a direct contact reader having an opening to receive the smart card for direct contact communication;
   a touch sensor capacitance circuit for detecting changes in charge; and
   at least one capacitance electrode coupled to the touch sensor capacitance circuit and disposed on the smart card reader adjacent to the opening of the direct contact reader, wherein the touch sensor capacitance circuit uses the signal strength that is measured on the at least one capacitance electrode to determine if the smart card is to be read by the near field communication antenna or the direct contact reader.

2. A method for determining if direct contact or contactless communication is to be performed with a smart card, said method comprised of:
   1) providing a smart card including a near field communication antenna for contactless communication, electrical traces for direct contact communication and an integrated circuit memory, 2) providing a smart card reader including at least one near field communication antenna for contactless communication and a direct contact reader for direct contact communication, a touch sensor capacitance circuit for detecting changes in charge, an opening for the direct contact reader to receive the smart card, and at least one capacitance electrode coupled to the touch sensor capacitance circuit and disposed on the smart card reader adjacent to the opening of the direct contact reader;
   3) detecting a presence of a smart card by detecting a change in capacitance on the at least one capacitance electrode; and
   4) determining if the smart card is to be read by the near field communication antenna or the direct contact reader of the smart card reader by using the signal strength that is measured on the at least one capacitance electrode.

3. The method as defined in claim 2 wherein the method further comprises:
   1) providing an opening for the direct contact reader to receive the smart card;
   2) disposing the at least one capacitance electrode adjacent to the opening of the direct contract reader; and
   3) determining that the smart card is to be read by signal strength that is measured on the at least one capacitance electrode.

4. The method as defined in claim 2 wherein the method further comprises providing a plurality of capacitance electrodes, at least one of the capacitance electrodes positioned adjacent to the at least one near field communication antenna, and at least one of the capacitance electrodes disposed adjacent to the direct contact reader.

5. The method as defined in claim 4 wherein the method further comprises comparing a relative signal strength of a signal from all of the capacitance electrodes in order to determine which if the capacitance electrodes is nearest to the smart card.

6. The method as defined in claim 5 wherein the method further comprises using a delay in measuring the signals from the capacitance electrodes before determining which of the capacitance electrodes is nearest to the smart card.

7. The method as defined in claim 6 wherein the method further comprises disposing a capacitance electrode inside the opening of the direct contact reader.

\* \* \* \* \*